United States Patent
Bauduin et al.

(10) Patent No.: US 11,542,832 B2
(45) Date of Patent: Jan. 3, 2023

(54) DEVICE FOR LUBRICATING AND COOLING A TURBOMACHINE BEARING

(71) Applicant: SAFRAN TRANSMISSION SYSTEMS, Colombes (FR)

(72) Inventors: Lionel Bauduin, Moissy-Cramayel (FR); Othmane Ez-Zahraouy, Moissy-Cramayel (FR)

(73) Assignee: SAFRAN TRANSMISSION SYSTEMS, Colombes (FR)

( * ) Notice: Subject to any disclaimer, the term of this patent is extended or adjusted under 35 U.S.C. 154(b) by 383 days.

(21) Appl. No.: 16/648,051

(22) PCT Filed: Sep. 19, 2018

(86) PCT No.: PCT/FR2018/052284
§ 371 (c)(1),
(2) Date: Mar. 17, 2020

(87) PCT Pub. No.: WO2019/058051
PCT Pub. Date: Mar. 28, 2019

(65) Prior Publication Data
US 2020/0256209 A1    Aug. 13, 2020

(30) Foreign Application Priority Data

Sep. 22, 2017  (FR) ..................................... 17 58792

(51) Int. Cl.
*F16C 33/66* (2006.01)
*F16C 35/077* (2006.01)
(Continued)

(52) U.S. Cl.
CPC ........... *F01D 25/125* (2013.01); *F01D 25/18* (2013.01); *F16C 33/6659* (2013.01);
(Continued)

(58) Field of Classification Search
CPC ................ F16C 33/6659; F16C 33/667; F16C 33/6674; F16C 33/6681; F16C 33/6685;
(Continued)

(56) References Cited

U.S. PATENT DOCUMENTS

| | | | |
|---|---|---|---|
| 4,596,476 A * | 6/1986 | Schill | F16C 37/007 384/471 |
| 7,374,019 B2 * | 5/2008 | Kosugi | F16C 33/6674 384/473 |

(Continued)

FOREIGN PATENT DOCUMENTS

| | | |
|---|---|---|
| DE | 102009051307 A1 | 5/2011 |
| FR | 2949246 A1 | 2/2011 |

(Continued)

OTHER PUBLICATIONS

Search Report issued in French Patent Application No. 1758792 dated Jun. 1, 2018.
International Search Report issued in Application No. PCT/FR2018/052284 dated Feb. 4, 2019.
Written Opinion issued in Application No. PCT/FR2018/052284 dated Feb. 4, 2019.

*Primary Examiner* — James Pilkington
(74) *Attorney, Agent, or Firm* — Pearne & Gordon LLP (57) ABSTRACT

A device for lubricating and cooling a turbomachine rolling bearing is at least partially annular. The device comprises a first duct and a second duct inclined with respect to the first duct. The first duct is configured to be in thermal contact with an outer ring of the rolling bearing that at least partially surrounds same. The second duct is fluidically connected to the first duct. The first duct is configured to circulate the lubricant for cooling the outer ring, towards a discharge outlet of the lubricant. The second duct is configured to eject the lubricant through a lubrication outlet towards the rolling bearing.

17 Claims, 4 Drawing Sheets

(51) Int. Cl.
  *F16C 37/00*  (2006.01)
  *F01D 25/12*  (2006.01)
  *F01D 25/18*  (2006.01)
  *F16N 7/40*  (2006.01)

(52) U.S. Cl.
  CPC ...... *F16C 33/6674* (2013.01); *F16C 33/6685* (2013.01); *F16C 35/077* (2013.01); *F16C 37/007* (2013.01); *F16N 7/40* (2013.01); *F05D 2260/98* (2013.01); *F16C 2360/23* (2013.01); *F16N 2210/02* (2013.01); *F16N 2210/14* (2013.01)

(58) Field of Classification Search
  CPC .. F16C 35/077; F16C 37/007; F16C 2360/23; F01D 25/125; F01D 25/18; F05D 2240/50; F05D 2260/98; F16N 2210/14
  See application file for complete search history.

(56) References Cited

U.S. PATENT DOCUMENTS

| | | | |
|---|---|---|---|
| 10,167,895 | B2 | 1/2019 | Bauduin et al. |
| 10,415,671 | B2 | 9/2019 | Bauduin et al. |
| 10,428,875 | B2 * | 10/2019 | Yoshino ................ F16C 37/007 |
| 2018/0328454 | A1 | 11/2018 | Bauduin et al. |
| 2019/0162313 | A1 | 5/2019 | Bauduin et al. |

FOREIGN PATENT DOCUMENTS

| | | |
|---|---|---|
| GB | 582082 A | 11/1946 |
| JP | 2010156376 A | 7/2010 |
| JP | 2011169356 A | 9/2011 |
| JP | 2014047812 A | 3/2014 |

\* cited by examiner

DEVICE FOR LUBRICATING AND COOLING A TURBOMACHINE BEARING

This is the National Stage of PCT international application PCT/FR2018/052284, filed on Sep. 19, 2018 entitled "DEVICE FOR LUBRICATING AND COOLING A TURBOMACHINE BEARING", which claims the priority of French Patent Application No. 17 58792 filed Sep. 22, 2017, both of which are incorporated herein by reference in their entirety.

TECHNICAL FIELD

The invention relates to bearings of rotating shafts for an aircraft turbomachine. More precisely, the invention relates to the lubrication and cooling of a turbomachine bearing.

BACKGROUND OF THE INVENTION

Turbomachine rotating shafts are rotatably supported and guided by bearings.

The outer ring of a bearing of a known structure is attached to a support which is part of the stator of the turbomachine. The bearing is continuously supplied with oil, to lubricate it and to limit its frictional wear.

The flow rate of oil used to cool the bearing is much higher than that which is used to lubricate the bearing. The significant overall flow rate of oil feeding the bearing generates significant energy losses and decreases the bearing efficiency.

DISCLOSURE OF THE INVENTION

The invention aims at at least partially solving problems encountered in prior art embodiments.

In this regard, one object of the invention is a lubricating and cooling device for a turbomachine bearing. The lubricating device is at least partially annular about an axis of the lubricating and cooling device.

According to the invention, the device comprises a first duct and a second duct which is fluidly connected to the first duct.

The first duct is configured to be in thermal contact with an outer ring of the bearing by at least partially surrounding the outer ring. The first duct is configured to circulate lubricant to cool the outer ring, to a discharge outlet for the lubricant configured to discharge lubricant in an opposite direction to the bearing.

The second duct is tilted with respect to the first duct. The second duct is configured to eject lubricant through a lubricating outlet to the bearing to lubricate the bearing.

By means of the lubricating and cooling device according to the invention, the bearing is sufficiently lubricated and cooled, while increasing the bearing efficiency.

The invention can optionally include one or more of the following characteristics combined with each other or not.

Preferably, the second duct is devoid of thermal contact with the bearing. The second duct is very preferably spaced from the outer ring.

Advantageously, the device comprises a common lubricant inlet to supply both the first duct and the second duct with lubricant.

According to one feature, the first duct is axially located between the lubricating outlet and the common lubricant inlet or between the lubricating outlet and the discharge outlet.

According to one advantageous embodiment, the device comprises a lubricant inlet which is located in the proximity of a first transverse end of the first duct. The first duct comprises the discharge outlet which is located at a second transverse end of the first duct which is opposite to the first end.

According to another feature, the lubricating outlet is oriented so as to spray lubricant onto a flank of a rolling element, preferably substantially axially.

Preferably, the discharge outlet is oriented substantially axially or substantially radially.

Advantageously, the lubricating device comprises a plurality of lubricant inlets, a plurality of discharge outlets and/or a plurality of lubricating outlets, which are spaced about the axis of the lubricating and cooling device.

Preferably, the lubricant inlets, discharge outlets and/or lubricating outlets are symmetrically located about the axis of the lubricating and cooling device.

According to one advantageous embodiment, the first duct is oriented substantially axially, the second duct being oriented substantially radially inwardly, with respect to the axis of the lubricating and cooling device.

According to another feature, the lubricating and cooling device is annular, the first duct being configured to be in thermal contact with the outer ring over at least most of the circumferential length of the outer ring.

Preferably, the second duct forms a circumferential rim of the lubricating and cooling device.

Advantageously, the first duct comprises a wall which includes at least one cooling element projecting inside the first duct. The cooling element is configured to increase thermal exchanges between the lubricant in the first duct and the outer ring.

Advantageously, the wall of the first duct and/or a wall of the second duct comprise at least one reinforcement configured to increase the mechanical strength of the lubricating and cooling device. The reinforcement is also configured to increase thermal exchanges between the lubricant in the duct and the outer ring.

The invention is also directed at a turbomachine assembly comprising a fixed support for a bearing, the bearing which comprises an outer ring, and a lubricating and cooling device as defined above.

The lubricating and cooling device at least partially surrounds the outer ring and it is radially located between the bearing and the support.

Preferably, the lubricating and cooling device is assembled rigidly integral with the support by the outer ring.

Preferably, the support comprises a radially outer surface and a radially inner surface opposite to the radially inner surface, the support being configured to supply the device with lubricant through a duct which extends through the support from the radially outer surface to the radially inner surface.

BRIEF DESCRIPTION OF THE DRAWINGS

The present invention will be better understood upon reading the description of exemplary embodiments, given by way of purely indicating and in no way limiting purposes, referring to the appended drawings in which.

DETAILED DISCLOSURE OF PARTICULAR EMBODIMENTS

Figure 1:
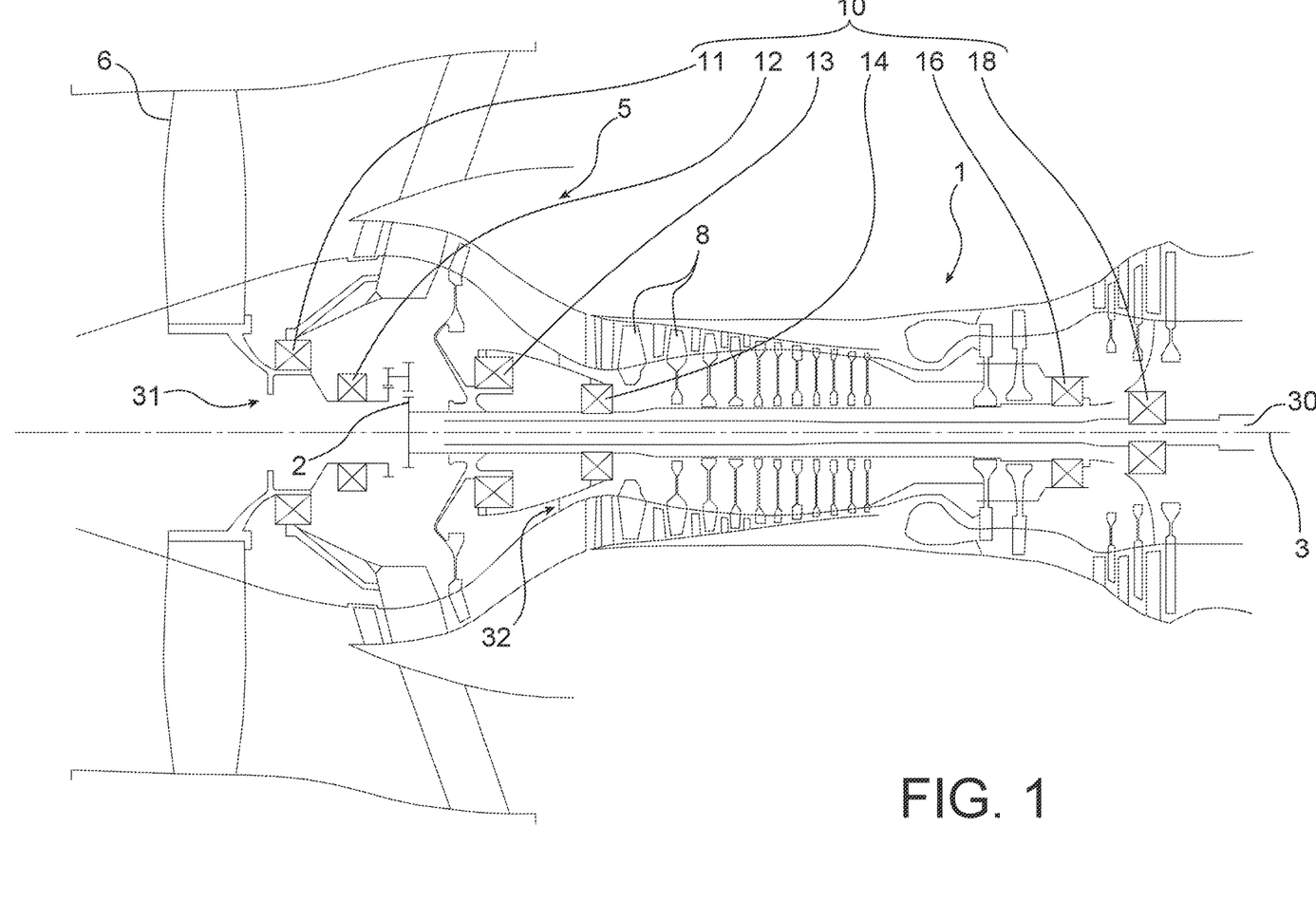
FIG. 1 is a schematic longitudinal cross-section view of a turbomachine according to the invention.

FIG. 1 represents an aircraft turbomachine 1 according to one preferred embodiment of the invention. The turbomachine 1 is a turbofan engine. It comprises a rotating shaft 30 which is movable about the main longitudinal axis 3 of the turbomachine 1.

The shaft 30 comprises in particular a front part 31 and a rear part 32 which are coaxial with each other. The front 31 and rear 32 parts are joined by a reducer 2 very schematically represented. They carry fan vanes 6, straightener vanes 8 and compressor vanes 8.

The fan vanes 6 and the compressor vanes 8 can be driven at different speeds of rotation through the reducer 2. The front shaft 31 is generally supported back and forth by a ball bearing 11 and a roller bearing 12 placed in the zone of the reducer 2. The rear part 32 of the shaft 30, which is much longer, is in this case supported back and forth first by a pair of ball bearings 13 and 14 and then by a pair of roller bearings 16 and 18. The outer ring of each of these six bearings is generally fixed to a stator case 5.

Usually, the efficiency of the line shafting 31, 32 is between 0.96 and 0.99, with losses essentially produced in the reducer 2. In spite of this high efficiency value, it is important to cool the rotating shaft 30 to discharge calorific power dissipated therein.

Each of the six bearings 11, 13, 14, 12, 16, 18 can support the shaft 30. It can also be mounted onto a rotating shaft of a low pressure turbine (not represented) or possibly onto a turbomachine shaft configured to rotate at high speeds of rotation, such as a shaft of a high pressure turbine (not represented).

Figure 2:
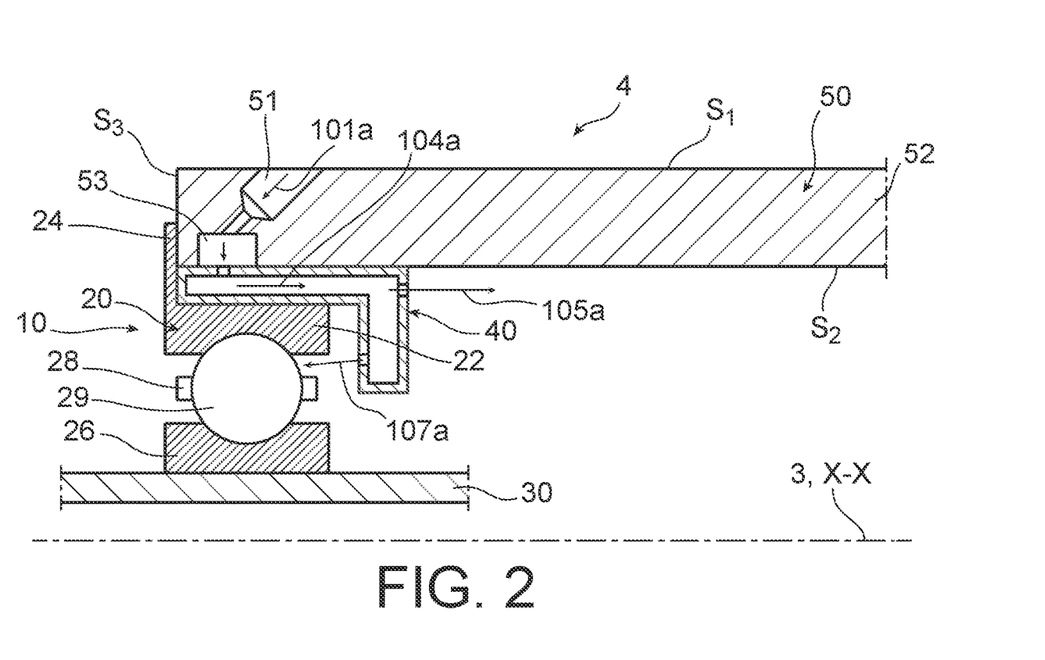
FIG. 2 is a longitudinal half-cross-section schematic view of an assembly of the turbomachine of FIG. 1, according to a first preferred embodiment of the invention.

The turbomachine assembly 4 comprises a fixed support 50, a bearing 10, and a lubricating and cooling device 40. The lubricant used is typically oil.

The assembly 4 is annular about a revolution axis X-X of the lubricating and cooling device. The axis X-X of the lubricating and cooling device is substantially the same as the longitudinal axis 3 of the turbomachine.

In the following text of the disclosure, the front and rear directions are defined with respect to a gas flow direction in the turbomachine, in the direction from the fan to the low pressure turbine.

The upstream and downstream directions are defined with reference to the lubricant flow direction. The lubricant flows from upstream to downstream in the lubricating and cooling device 40.

Unless otherwise indicated, the adjectives "axial" and "radial" are defined with respect to the revolution axis X-X of the lubricating and cooling device 40. An axial direction is a direction substantially parallel to the axis X-X of the lubricating and cooling device 40. A radial direction is a direction substantially orthogonal to the axis X-X of the lubricating and cooling device 40 and intersecting the axis X-X of the lubricating and cooling device. A circumferential direction is a direction about the axis X-X of the lubricating and cooling device.

The fixed support 50 is part of the turbomachine stator 5. It comprises a case portion 52 and a lubricant supplying duct 51. It is used as a support for the bearing 10 and for the lubricating and cooling device 40.

The case portion 52 comprises a radially outer surface $S_1$, a radially inner surface $S_2$ and a front surface $S_3$. The radially inner surface $S_2$ is opposite to the radially inner surface $S_1$.

The inlet duct 51 extends from the radially outer surface $S_1$ to the radially inner surface $S_2$. It is used to convey lubricant through the case segment 52 to the lubricating and cooling device 40.

The inlet duct 51 comprises a supply cavity 53 which is located in the proximity of the radially inner surface $S_2$ and is used as a lubricant reserve for the lubricating and cooling device 40.

The rolling 10 comprises an outer ring 20, an inner ring 26, a bearing cage 28 and rolling elements 29. The bearing 10 is in particular one of the bearings 11, 12, 13, 14, 16, 18 which is represented in FIG. 1.

The outer ring 20 comprises a body 22 and a fastener 24 which is rigidly integral with the body 22. The outer ring 20 is in particular in one piece.

The body 22 forms a bearing race for the rolling elements 29. The fastener 24 is used to rigidly secure the bearing 10 to the support 50. The fastener 24 fastens the body 22 and the lubricating and cooling device 40 to the front surface $S_3$ of the support 50.

The inner ring 26 is located radially inwardly with respect to the outer ring 20. It is rigidly integral with the turbomachine shaft 30.

The bearing cage 28 and the rolling elements 29 are radially located between the inner ring 26 and the outer ring 20. The bearing cage 28 is configured to guide movement of the rolling elements 29 in the bearing race relative to the support 50.

The rolling elements 29 can be of different natures, typically balls, rollers or needles. They are located about the axis X-X of the lubricating and cooling device 40.

The lubricating and cooling device 40 is annular about the axis X-X of the device. The lubricating and cooling device 40 partially surrounds the outer ring 20. It is radially located between the bearing 10 and the support 50.

It takes the form of an annulus comprising a first duct 60 which forms the annulus body, and a second duct 80 which forms a circumferential rim of the device 40.

It also comprises a plurality of lubricant inlets 41, a plurality of discharge outlets 45 and a plurality of lubricating outlets 43. The device 4 comprises in particular as many lubricant inlet 41 as lubricating outlets 43 and as many lubricating outlets 43 as discharge outlets 45.

Figure 3:
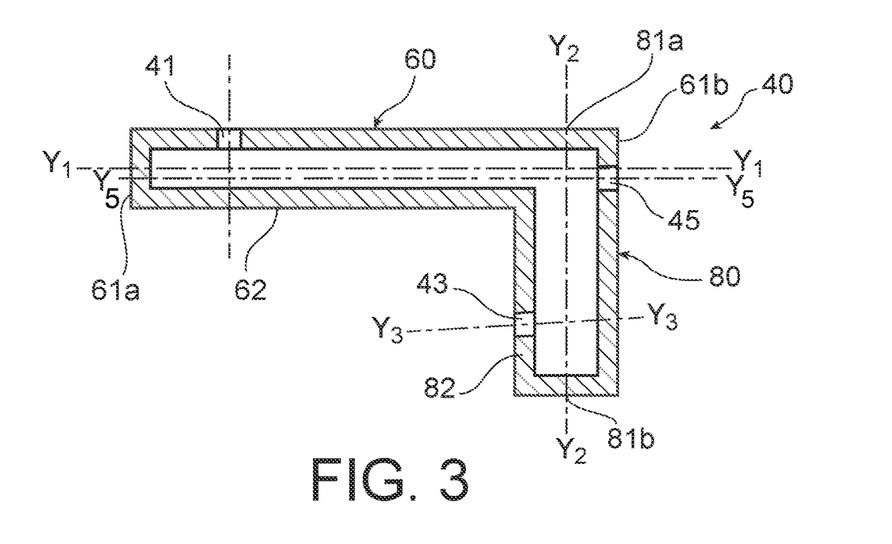
FIG. 3 is a part of a longitudinal half-cross-section schematic view of a lubricating and cooling device according to the first embodiment of the invention.

The first duct 60 comprises a tubular wall 62 which is in mechanical and thermal contact with the outer ring 20. The tubular wall 62 surrounds the outer ring 20 substantially over the entire circumferential length of the outer ring 20.

The first duct 60 is transversally axially oriented along a transverse direction $Y_1$-$Y_1$. It extends axially between a first transverse end 61*a* and a second transverse end 61*b*. The first transverse end 61*a* forms the front end of the first duct 60. The second transverse end 61*b* forms the rear end of the first duct 60.

With reference to FIGS. 2 and 3, the lubricant inlets 41 which are located in the proximity of the first transverse end 61*a* pass through the tubular wall 62. The discharge outlets 45 which are located at the second transverse end 61*b* also pass through the tubular wall 62. In other words, the first duct 60 extends transversally between the lubricant inlets 41 and the lubricating outlets 43.

The first duct 60 is configured to circulate lubricant from the lubricant inlet 41 to the discharge outlet 45, without this lubricant supplying the bearing 10. The first duct 60 is used to circulate lubricant to cool the outer ring 20.

The second duct 80 is fluidly connected to the first duct 60, by being tilted with respect to the first duct 60.

The second duct 80 comprises a tubular wall 82 which forms a bend with the tubular wall 62 of the first duct, by being located axially in the proximity of the second end 61*b* of the first duct.

The tubular wall 82 of the second duct 80 is located axially at a distance from the bearing 10. The tubular wall 82 is facing the outer ring 20 and the bearing cage 28 over substantially the entire circumferential length of the bearing 10. The lubricating outlets 43 which are oriented to the bearing 10 pass through the tubular wall 82.

The second duct 80 is oriented transversally radially inwardly along a transverse direction $Y_2$-$Y_2$. The second duct 80 extends radially between a first transverse end 81*a* and a second transverse end 81*b*. The first transverse end 81*a* forms the upper end of the second duct 80. The second transverse end 81*b* forms the lower end of the first duct 80.

The second duct 80 is configured to eject lubricant circulated in the first duct 60 to the bearing 10, to lubricate the bearing 10.

With reference to FIGS. 2 and 3, the lubricant inlets 41 are symmetrically spaced from each other about the axis X-X of the device, by being located in the proximity of the front transverse end 61*a*. The lubricant inlets 41 are each facing an outlet of the supply cavity 53 which supply them with lubricant. They are oriented substantially radially.

The inlets 41 are inlets common to the first duct 60 and to the second duct 80, that they supply with lubricant.

The discharge outlets 45 are symmetrically spaced from each other about the axis X-X of the device, by being located at the distal end 61*b* of the first duct. They pass through the rear of the wall 82 of the second duct.

They are offset radially inwardly with respect to the lubricant inlets 41.

The discharge outlets 45 are each oriented along a discharge direction $Y_5$-$Y_5$ which is slightly tilted with respect to the axis X-X of the lubricating and cooling device 4, such that the lubricant is axially sprayed opposite to the rolling elements 29. The discharge outlets 45 are configured to discharge lubricant that enabled the bearing 10 to be cooled and which is not used to lubricate the bearing 10.

Still With reference to FIGS. 2 and 3, the lubricating outlets 43 are symmetrically spaced from each other about the axis X-X of the device. They pass through the front of the wall 82 of the second duct, to the bearing 10.

The lubricating outlets 43 are axially located between the inlets 41 and the discharge outlets 45. They are offset radially inwardly with respect to the inlets 41 and the discharge outlets 45.

The lubricating outlets 43 are each oriented along a lubrication direction $Y_3$-$Y_3$ which is slightly tilted with respect to the axis X-X of the lubricating and cooling device 4, such that the lubricant is sprayed onto the flanks of the rolling elements 29. The lubricating outlets 43 are configured to spray lubricant from the second duct 80 to the bearing 10 to lubricate the bearing 10.

The operation of the lubricating and cooling device 40 according to the first embodiment is described below.

An inlet stream 101*a* flows in the inlet duct 51 towards the common lubricant inlet 41. The lubricant stream passing through the common inlet 41 flows along the transverse direction $Y_1$-$Y_1$ of the first duct towards the rear end 61*b*, by forming a cooling stream 104*a*. Most of the lubricant is then ejected through the discharge outlet 45 along a discharge stream 105*a*. The rest of the lubricant circulates in the second duct 80 towards the lubricating outlet 43 where it is ejected to the bearing 10 along a lubricating stream 107*a*.

Figure 4:
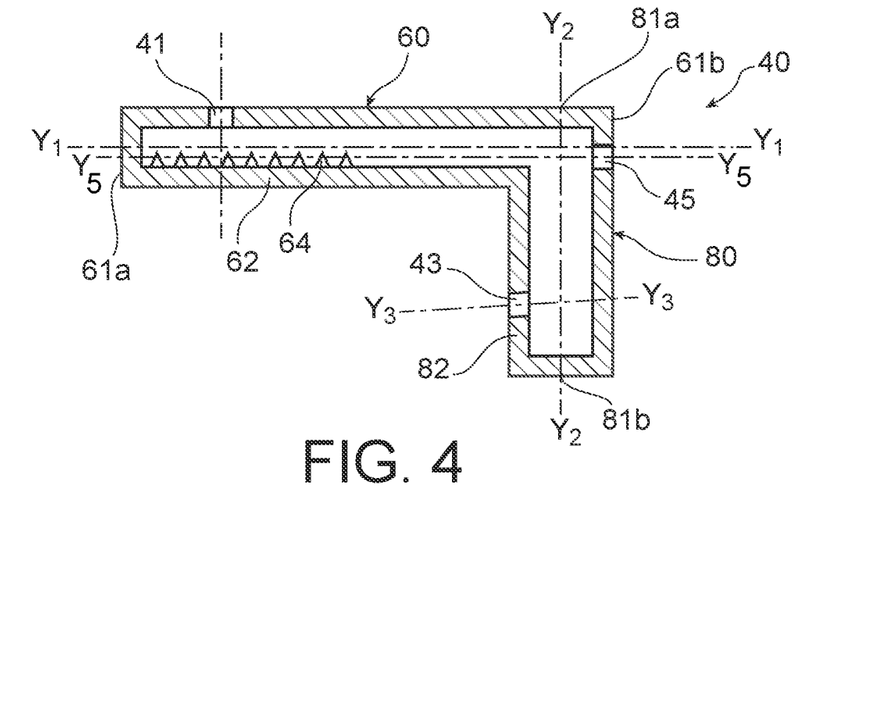
FIG. 4 is a part of a longitudinal half-cross-section schematic view of a lubricating and cooling device according to a first alternative embodiment of the first embodiment of the invention.

With reference to FIG. 4, the first alternative embodiment differs from the first embodiment in that the tubular wall 62 of the first duct 60 comprises cooling elements 64 which project inside the first duct 60 to the transverse axis $Y_1$-$Y_1$ of the first duct. The cooling elements 64 are spaced from each other along the circumferential direction of the first duct 60. They are axially spaced from each other between the first end 61*a* and the second end 61*b* of the first duct.

These cooling elements 64 take in particular the form of cooling fins. They are configured to increase heat exchanges between the lubricant in the first duct 60 and the outer ring 20.

Figure 5:
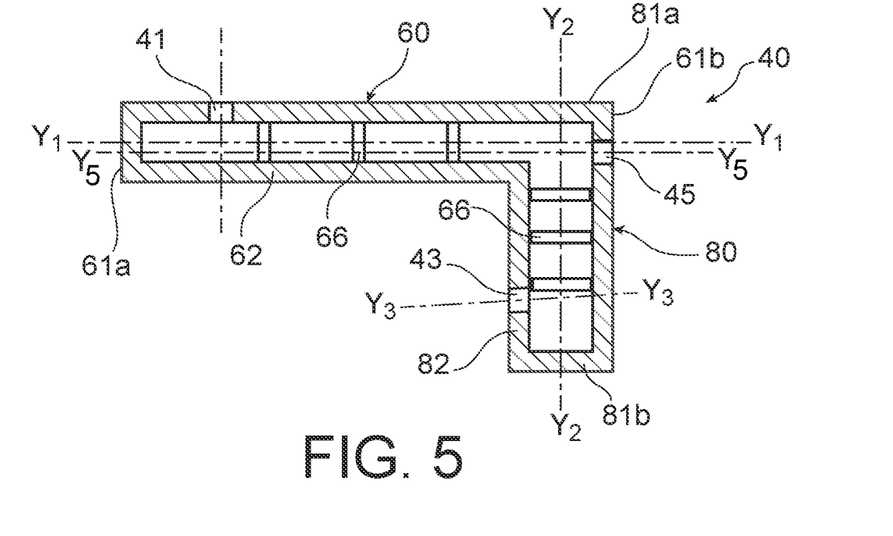
FIG. 5 is a part of a longitudinal half-cross-section schematic view of a lubricating and cooling device according to a second alternative embodiment of the first embodiment of the invention.

With reference to FIG. 5, the second alternative embodiment differs from the first embodiment in that the tubular wall 62 of the first duct 60 comprises reinforcements 66 which project inside the first duct 60 to the transverse axis $Y_1$-$Y_1$ of the first duct. The reinforcements 66 are spaced from each other along the circumferential direction of the first duct 60. They are axially spaced from each other axially between the first end 61*a* and the second end 61*b* of the first duct.

These reinforcements 66 take in particular the form of bridges which extend along diameters of the first duct 60. They are configured to increase the mechanical strength of the lubricating and cooling device 40.

Figure 6:
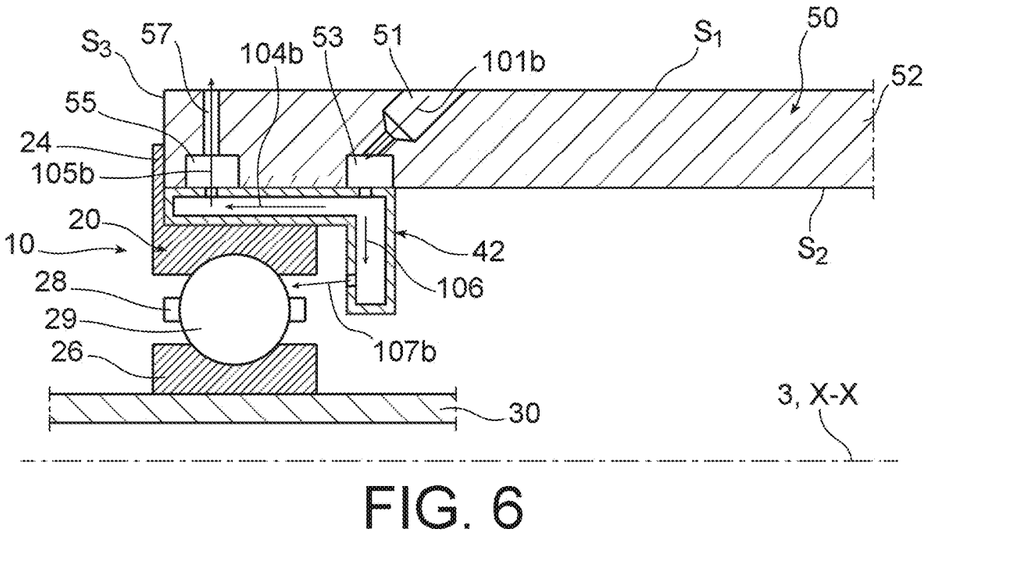
FIG. 6 is a longitudinal half-cross-section schematic view of an assembly of the turbomachine of FIG. 1, according to a second preferred embodiment of the invention.
Figure 7:
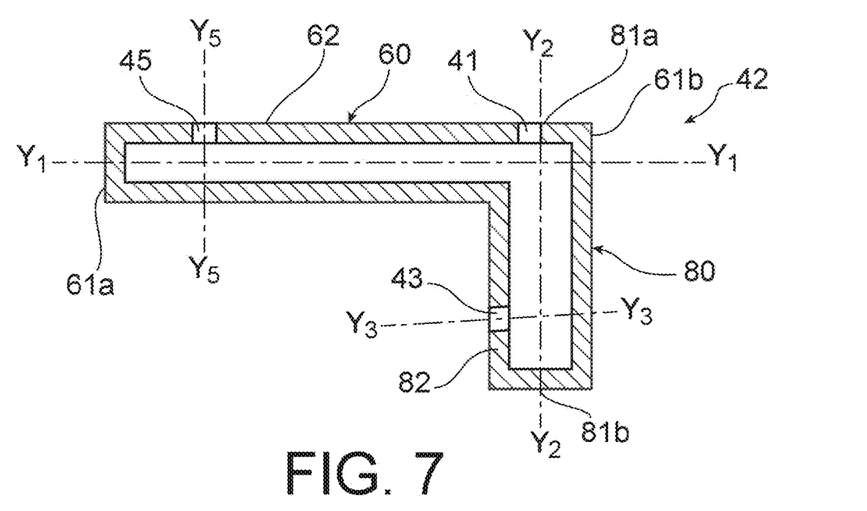
FIG. 7 is a part of a longitudinal half-cross-section schematic view of a lubricating and cooling device according to the second embodiment of the invention.

The second embodiment is represented with reference to FIGS. 5 and 6. The assembly 4 according to the second embodiment differs from that of the first embodiment in the structure of the support 50 and in that of the lubricating and cooling device 42.

With reference to FIG. 6, the support 50 comprises the supply duct 51 and an outlet duct 57. The supply duct 51 is of a similar form to that of the first embodiment, by being offset rearwardly with respect to that of the first embodiment to open into the common inlets 41.

The outlet duct 57 extends from the radially inner surface $S_2$ up to the radially outer surface $S_1$. It is used to discharge lubricant used to cool the outer ring 20 out of the assembly 4.

The outlet duct 57 comprises an outlet cavity 55 which is located in the proximity of the radially inner surface $S_2$ and which forms a lubricant reserve for the lubricating and cooling device 42.

In reference mainly to FIG. 6, the lubricating and cooling device 42 according to the second embodiment differs from that of the first embodiment in the position of the common inlet 41 and in the position of the discharge outlet 45. The first duct 60 is axially located between the lubricating outlet 43 and the discharge outlet 45.

The common inlet 41 is offset rearwardly with respect to that of the first embodiment. The common inlet 41 is located in the proximity of the second transverse end 61*b* of the first duct, instead of being in the proximity of its first transverse end 61*a*. In other words, the common inlet 41 is located in the proximity of the junction between the first duct 60 and the second duct 80. The inlet 41 is configured to divide the lubricant stream passing through it into a transit stream 106 in the second duct 80 and into a cooling stream 104*b*.

The discharge outlet 45 is offset frontwardly and upwardly with respect to that of the first embodiment. The discharge outlet 45 is oriented substantially radially outwardly along the direction $Y_5$-$Y_5$, that is in a direction opposite to the bearing 10.

The operation of the lubricating and cooling device 42 according to the second embodiment is described below.

An inlet stream 101*b* flows in the inlet duct 51 towards the common lubricant inlet 41. The lubricant stream passing through the common inlet 41 is divided from the inlet 41 into a transit stream 106 in the second duct and a cooling stream 104*b* flowing in the first duct 60.

All the lubricant in the second duct 80 is ejected through the lubricating outlet 43 along a lubricating stream 107*b*. All the lubricant in the first duct 60 is ejected through the discharge outlet 45 in the outlet duct 57 radially outwardly from the assembly 4 along a discharge stream 105*b*.

The first duct 60 enables the bearing 10 to be efficiently cooled, by limiting the lubricant amount injected into the bearing 10. The second duct 80 enables the bearing 10 to be lubricated. The lubricating and cooling device 40, 42 efficiently cools and lubricates the bearing 10, while increasing the efficiency of the bearing 10.

In the first embodiment, the lubricant circulating in the second duct 80, that is the lubricating stream 107*a*, has circulated in the first duct 60. Therefore, it has been used for cooling the outer ring 20 in the first duct 60 and the cooling stream 104*a* is more important. The lubricant injected in the bearing 10 however has a higher temperature. The lubricant injected for lubricating purposes also has a lower viscosity.

In the second embodiment, the lubricant circulating in the second duct 80, that is the transit stream 106, has not circulated in the first duct 60. Therefore, it has not been heated by thermal contact with the outer ring 20. The lubricant injected in the bearing 10 has a lower temperature, which promotes heat exchanges inside the bearing 10. The lubricant has a stronger viscosity. Therefore, it tends to more lubricate the bearing 10.

The assembly 4 according to the first embodiment is preferred when the lubricant temperature is low relative to that of the bearing 10. The assembly 4 according to the second embodiment is preferred when the temperature of the lubricant entering the lubricating and cooling device 40, 42 is higher.

Of course, various modifications can be provided by those skilled in the art to the invention just described without departing from the scope of disclosure of the invention.

The structure of the turbomachine 1 can vary. It can also be a turboprop engine or a turbine engine.

Generally, the axis X-X of the lubricating and cooling device is substantially parallel to the axis 3 of the turbomachine. According to an alternative embodiment, it is strictly parallel to the axis 3 of the turbomachine.

Alternatively, the lubricating and cooling device 40, 42 comprises a heat transfer layer between the wall 62 of the first duct 60 and the outer ring 20.

The lubricating and cooling device 40, 42 can be attached to the support 50 directly rather than through the outer ring 20.

Further alternatively, the lubricating device 40, 42 is in one piece with the support 50.

The shape of the lubricating and cooling device 40, 42 can vary. In particular, the second duct can be tilted by an angle different from 90° with respect to the first duct 60.

The number, distribution and orientation of the inlets 41, lubricating outlets 43 and discharge outlets 45 can vary. The lubricating and cooling device 40, 42 can include more inlets than lubricating outlets 43.

What is claimed is:

1. A lubricating and cooling device for a bearing of a turbomachine, wherein the lubricating and cooling device is at least partially annular about an axis of the lubricating and cooling device, wherein the lubricating and cooling device comprises:
    a first duct which is configured to be in thermal contact with an outer ring of the bearing by at least partially surrounding the outer ring, wherein the first duct comprises a discharge outlet,
    a second duct which is transverse to the first duct and is fluidly connected to the first duct, wherein the second duct comprises a lubricating outlet,
    wherein the first duct is configured to circulate lubricant to the discharge outlet of the lubricant to cool the outer ring, wherein the discharge outlet is configured to discharge lubricant out of the lubricating and cooling device in a direction away from the bearing, and
    wherein the second duct is configured to eject lubricant out of the lubricating and cooling device through the lubricating outlet toward the bearing in order to lubricate the bearing.

2. The lubricating and cooling device according to claim 1, wherein the lubricating and cooling device comprises a common lubricant inlet to supply both the first duct and the second duct with lubricant.

3. The lubricating and cooling device according to claim 2, wherein the first duct is axially located between the lubricating outlet and the common lubricant inlet.

4. The lubricating and cooling device according to claim 1, wherein the lubricating and cooling device comprises a lubricant inlet which is located adjacent a first transverse end of the first duct,
    wherein the discharge outlet is located at a second transverse end of the first duct which is opposite to the first end of the first duct.

5. The lubricating and cooling device according to claim 1, wherein the lubricating outlet is configured to spray lubricant onto a flank of a rolling element.

6. The lubricating and cooling device according to claim 5, wherein the lubricating outlet is oriented in a direction parallel to the axis of the lubricating and cooling device.

7. The lubricating and cooling device according to claim 5, wherein the discharge outlet is oriented in a direction parallel to the axis of the lubricating and cooling device.

8. The lubricating and cooling device according to claim 5, wherein the discharge outlet is oriented in a direction that is transverse to the axis of the lubricating and cooling device.

9. The lubricating and cooling device according to claim 1, wherein the lubricating and cooling device comprises a plurality of lubricant inlets, a plurality of discharge outlets and/or a plurality of lubricating outlets, wherein the plurality of lubricant inlets, discharge outlets and/or lubricating outlets are spaced about the axis of the lubricating and cooling device.

10. The lubricating and cooling device according to claim 9, wherein the lubricant inlets, the discharge outlets and/or the lubricating outlets are symmetrically located about the axis of the lubricating and cooling device.

11. The lubricating and cooling device according to claim 1, wherein the first duct is oriented axially with respect to the axis of the lubricating and cooling device, wherein the second duct extends radially inwardly toward the axis of the lubricating and cooling device.

12. The lubricating and cooling device according to claim 1, wherein the lubricating and cooling device is annular, wherein the first duct is configured to be in thermal contact with the outer ring over at least a majority of the circumferential length of the outer ring.

13. The lubricating and cooling device according to claim 12, wherein the second duct is a circumferential rim of the lubricating and cooling device.

14. The lubricating and cooling device according to claim 1, wherein an inner wall of the first duct comprises at least one cooling element which is projecting into the first duct and which is configured to increase heat exchanges between the lubricant in the first duct and the outer ring.

15. The lubricating and cooling device according to claim 1, wherein an inner wall of the first duct or an inner wall of the second duct comprise at least one reinforcement which is configured to increase the mechanical strength of the lubricating and cooling device.

16. The lubricating and cooling device according to claim 1, wherein at least a portion of the first duct is axially located between the lubricating outlet and the discharge outlet.

17. A turbomachine assembly comprising a fixed support for a bearing, the bearing comprises an outer ring, and a lubricating and cooling device according to claim 1,
wherein the lubricating and cooling device at least partially surrounds the outer ring and wherein the lubricating and cooling device is radially located between the bearing and the support.

* * * * *